United States Patent
Hsu et al.

(10) Patent No.: US 9,494,961 B2
(45) Date of Patent: Nov. 15, 2016

(54) FEEDBACK DEVICE AND METHOD FOR CONSTANT CURRENT DRIVER

(71) Applicant: NOVATEK Microelectronics Corp., Hsin-Chu (TW)

(72) Inventors: Min-Chieh Hsu, Taoyuan (TW); Wen-Hsin Cheng, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 14/818,314

(22) Filed: Aug. 5, 2015

(65) Prior Publication Data

US 2016/0239030 A1    Aug. 18, 2016

(30) Foreign Application Priority Data

Feb. 12, 2015    (TW) .............................. 104104817 A

(51) Int. Cl.
| H05B 41/282 | (2006.01) |
| G05F 1/575 | (2006.01) |
| H05B 33/08 | (2006.01) |
| H02M 3/157 | (2006.01) |
| H02M 3/158 | (2006.01) |
| F21S 4/00 | (2016.01) |

(52) U.S. Cl.
CPC ............ G05F 1/575 (2013.01); H05B 33/0812 (2013.01); H05B 33/0851 (2013.01)

(58) Field of Classification Search
CPC ............ H05B 33/0803; H05B 33/0815; H05B 33/0839; H05B 33/0842; H05B 41/282; H05B 41/2821; H05B 41/2824; H02M 3/156; H02M 3/157; H02M 3/158; H02M 2001/0025
See application file for complete search history.

(56) References Cited

U.S. PATENT DOCUMENTS 8,390,262 B2 *   3/2013   Chang ................ H05B 33/0818
                                                         315/209 R
2011/0227497 A1 *  9/2011  Hu ..................... H05B 33/0809
                                                         315/224

(Continued)

FOREIGN PATENT DOCUMENTS

| CN | 103108445 A | 5/2013 |
| CN | 104349529 A | 2/2015 |

(Continued)

*Primary Examiner* — Gary L Laxton
(74) *Attorney, Agent, or Firm* — Winston Hsu; Scott Margo

(57) ABSTRACT

A feedback device for a constant current driver controls a power supply module in the constant current driver to generate an output voltage. The constant current driver drives an electrical load with an output current. The feedback device includes a feedback control module and a feedback output unit. The feedback control module is utilized for receiving a load driven voltage related to the electrical load and generating a control voltage accordingly. The feedback output unit is utilized for generating a feedback current via an equivalent resistor of the feedback output unit according to a voltage difference between the control voltage and a feedback voltage of the power supply module. The power supply module controls the magnitude of the output voltage according to the feedback current, allowing the constant current driver to drive the electrical load with the output current.

11 Claims, 3 Drawing Sheets

(56) References Cited

U.S. PATENT DOCUMENTS

| | | | | |
|---|---|---|---|---|
| 2011/0248639 A1* | 10/2011 | Peker | ............... | H05B 33/0818 |
| | | | | 315/192 |
| 2012/0081009 A1* | 4/2012 | Shteynberg | ........... | H05B 33/083 |
| | | | | 315/122 |
| 2014/0211192 A1* | 7/2014 | Grootjans | ........... | H05B 33/0818 |
| | | | | 356/5.01 |
| 2015/0123550 A1* | 5/2015 | Kunst | ............... | H05B 33/0815 |
| | | | | 315/186 |

FOREIGN PATENT DOCUMENTS

| | | |
|---|---|---|
| EP | 1894300 B1 | 10/2008 |
| TW | 200820825 | 5/2008 |
| TW | 201026154 A1 | 7/2010 |
| TW | 201225737 A1 | 6/2012 |
| TW | 201343000 A | 10/2013 |

\* cited by examiner

FEEDBACK DEVICE AND METHOD FOR CONSTANT CURRENT DRIVER

BACKGROUND OF THE INVENTION

1. Field of the Invention

The present invention relates to feedback device and method for a constant current driver, and more particularly, to a feedback device and method with a negative feedback mechanism to allow a constant current driver to output a constant voltage to the load terminal to realize constant current driving.

2. Description of the Prior Art

Light emitting diodes (LEDs) are widely utilized in various fields such as backlight light sources of a display, outdoor and indoor illumination, visual display, light communication and infrared communications, due to their advantages of high energy conversion efficiency, low power requirements, small volume, fast response speed and long life, etc. Since the brightness of LEDs is related to the current flowing through the LEDs, a stable voltage should be applied to the LEDs (e.g., via a regulator), and a current source is implemented to provide a stable current for the LEDs, in order to allow the LEDs to output stable brightness.

However, there are always noises in an electronic device, such that the voltage and/or current outputted by the regulator and/or current source deviate from a predetermined value; hence, the current flowing through the LEDs may vary, resulting in unstable brightness. Therefore, a feedback mechanism is required to stabilize the voltage for driving the LEDs, in order to allow the current flowing through the LEDs to become stable. European Patent No. EP 1894300B1 discloses a circuit structure with multiple current sources, where a comparator is implemented to detect the voltage level on the output terminal, and voltage variations detected by the comparator may control the multiple current sources to be turned on or off, in order to control the regulator's output voltage to remain on a constant value. If the LEDs are applied as backlight sources of a display, the LEDs should output different brightness according to the color needing to be displayed. With different brightness requirements, the above current sources need to output a wide range of currents, e.g., 1 μA-128 μA. If one current source is used for realizing 1 μA current output, 128 μA current output will need 128 same current sources, which occupy a quite large layout area. In addition, all current sources in the large layout area cannot be gathered together. In such a situation, these current sources do not match and are easily influenced by process variation, such that there are differences generated between the output currents of every current source. This reduces the accuracy of output currents. When the currents from the $1^{st}$ stage (1 μA) to the $128^{th}$ stage (128 μA) have different rising degrees, there may be linearity errors and noises are easily generated in the load terminal, resulting in occurrence of blinks on the LEDs. Furthermore, the abovementioned linearity errors may also result in the problem of electromagnetic interference (EMI).

Thus, there is a need to provide another feedback mechanism to improve the abovementioned problems.

SUMMARY OF THE INVENTION

It is therefore an objective of the present invention to provide a feedback device and method, which are capable of adjusting the output voltage and output current of a constant current driver by adjusting a reference voltage, to drive light emitting diodes (LEDs) with a constant current. In this manner, layout areas required for multiple current sources may be saved, and the linearity problem of voltage adjustment may also be improved, which prevents occurrence of the problems such as LED blinks and electromagnetic interference (EMI).

The present invention discloses a feedback device for a constant current driver. The feedback device controls a power supply module in the constant current driver to generate an output voltage, wherein the constant current driver drives an electrical load with an output current. The feedback device includes a feedback control module and a feedback output unit. The feedback control module is utilized for receiving a load driven voltage related to the electrical load and generating a control voltage accordingly, wherein the load driven voltage is a load voltage or generated from the load voltage. The feedback output unit, coupled between the feedback control module and the power supply module, is utilized for generating a feedback current via an equivalent resistor of the feedback output unit according to a voltage difference between the control voltage and a feedback voltage of the power supply module. The power supply module controls the magnitude of the output voltage according to the feedback current, allowing the constant current driver to drive the electrical load with the output current.

The present invention further discloses a feedback method for a constant current driver, for controlling a power supply module of the constant current driver to generate an output voltage, wherein the constant current driver drives an electrical load with an output current. The feedback method includes receiving a load driven voltage related to the electrical load and generating a control voltage accordingly, wherein the load driven voltage is a load voltage or generated from the load voltage. The feedback method further includes generating a feedback current via an equivalent resistor according to a voltage difference between the control voltage and a feedback voltage of the power supply module, wherein the feedback current is utilized for controlling a magnitude of the output voltage, allowing the constant current driver to drive the electrical load with the output current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
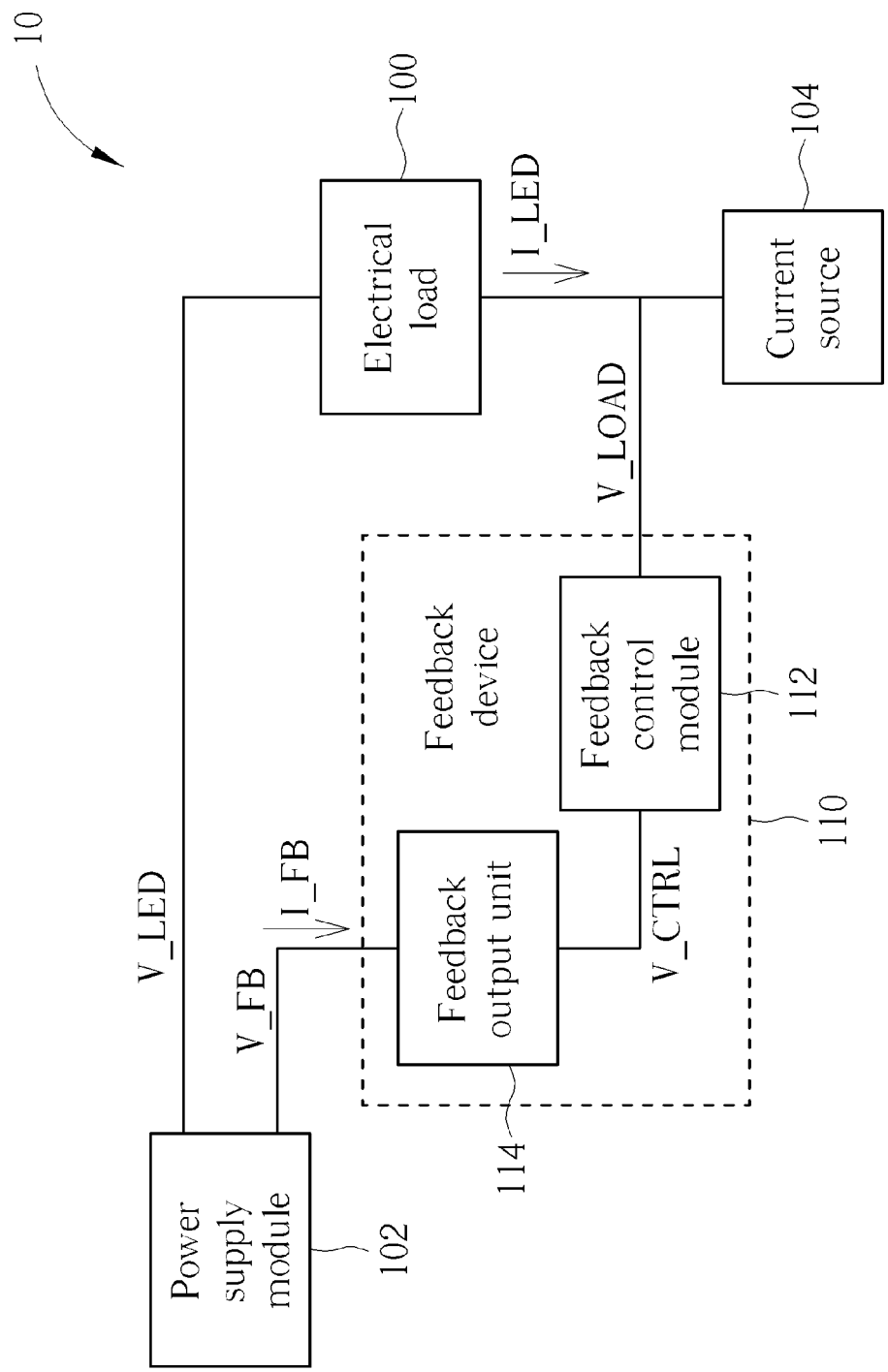
FIG. 1 is a schematic diagram of a constant current driver according to an embodiment of the present invention.

Please refer to FIG. 1, which is a schematic diagram of a constant current driver 10 according to an embodiment of the present invention. As shown in FIG. 1, the constant current driver 10 is utilized for driving an electrical load 100. The constant current driver 10 includes a power supply module 102, a current source 104 and a feedback device 110. The electrical load 100 may include a plurality of light emitting diodes (LEDs) or any circuit elements capable of executing specific functions according to received voltages and currents. The constant current driver 10 may drive operations of the electrical load 100 with an output voltage V_LED and an output current I_LED. The power supply module 102 is utilized for generating the output voltage V_LED provided for the electrical load 100. The current source 104 may generate the output current I_LED for driving the electrical load 100.

The feedback device 110 includes a feedback control module 112 and a feedback output unit 114. The feedback control module 112 is utilized for receiving a load voltage V_LOAD of the electrical load 100 and generating a control voltage V_CTRL accordingly. The feedback output unit 114, coupled between the feedback control module 112 and the power supply module 102, may generate a feedback current I_FB via an equivalent resistor inside the feedback output unit 114 according to a voltage difference between the control voltage V_CTRL and a feedback voltage V_FB of the power supply module 102. In such a situation, the power supply module 102 may control the magnitude of the output voltage V_LED according to the feedback current I_FB, so that the output voltage V_LED may become stable, in order to allow the constant current driver 10 to drive the electrical load 100 with the output current I_LED.

In detail, the feedback control module 112 receives the load voltage V_LOAD from a terminal of the electrical load 100, and generates the control voltage V_CTRL accordingly. The feedback output unit 114 then generates the feedback current I_FB according to a voltage difference between the control voltage V_CTRL and the feedback voltage V_FB. As a result, the power supply module 102 may control the magnitude of the output voltage V_LED according to the feedback current I_FB. For example, if the output voltage V_LED tends to fall, the load voltage V_LOAD may fall accordingly, and the feedback control module 112 may generate a lower control voltage V_CTRL according to the lower load voltage V_LOAD. Then, if the feedback voltage V_FB is greater than the control voltage V_CTRL, the lower control voltage V_CTRL may generate a larger voltage difference between the feedback voltage V_FB and the control voltage V_CTRL, which further allows the feedback output unit 114 to generate a larger feedback current I_FB. In such a situation, the feedback current I_FB may flow through voltage dividing resistors in the power supply module 102, so that the output voltage V_LED of the power supply module 102 may rise back to a predetermined value. The above negative feedback mechanism prevents the output voltage V_LED from falling (e.g., due to noise interferences). On the other hand, if the output voltage V_LED tends to rise, the same feedback mechanism may also apply to control the feedback output unit 114 to generate a smaller feedback current I_FB or a reverse feedback current I_FB (i.e., the feedback current I_FB flows to the power supply module 102 from the feedback device 110), so that the output voltage V_LED may fall back to the predetermined value, in order to prevent the output voltage V_LED from rising (e.g., due to noise interferences).

Figure 2:
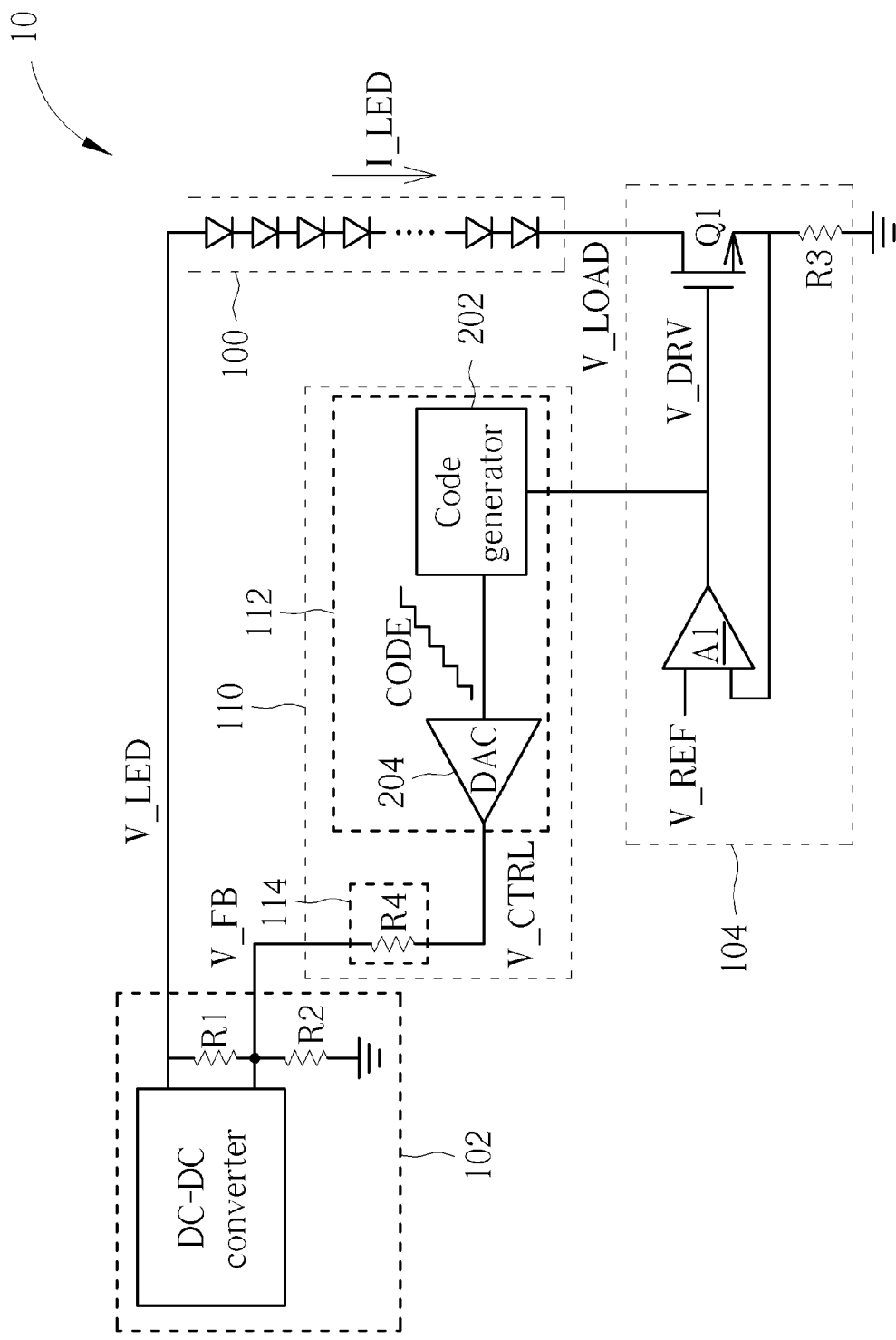
FIG. 2 is a schematic diagram of an implementation of the constant current driver shown in FIG. 1.

Please refer to FIG. 2, which is a schematic diagram of an implementation of the constant current driver 10. As shown in FIG. 2, the electrical load 100 may be a plurality of LEDs connected in series. The power supply module 102 may be a DC-DC converter, of which the output terminal includes voltage dividing resistors R1 and R2, for determining the output voltage V_LED of the power supply module 102. The current source 104 includes an output resistor R3, an output transistor Q1 and an amplifier A1. The drain terminal of the output transistor Q1 is coupled to a terminal of the electrical load 100, the source terminal of the output transistor Q1 is coupled to the output resistor R3, and the gate terminal of the output transistor Q1 is coupled to a load feedback terminal. A first input terminal of the amplifier A1 is coupled to a constant voltage source, for receiving a reference voltage V_REF such as a bandgap reference voltage. A second input terminal of the amplifier A1 is coupled between the source terminal of the output transistor Q1 and the output resistor R3, for controlling the source voltage of the output transistor Q1 to be equal to the reference voltage V_REF, so that the current source 104 may determine the output current I_LED for driving the electrical load 100 by using the voltage value of the reference voltage V_REF and the resistance value of the output resistor R3. The output terminal of the amplifier A1 is coupled to the load feedback terminal and the gate terminal of the output transistor Q1.

Please keep referring to FIG. 2. The feedback control module 112 includes a code generator 202 and a digital-to-analog converter (DAC) 204. The code generator 202 is coupled to the load feedback terminal, for receiving a load driven voltage V_DRV from the load feedback terminal. The load driven voltage V_DRV is converted from the load voltage V_LOAD. More specifically, when the load voltage V_LOAD of a terminal of the electrical load varies, the output transistor Q1 and the amplifier Al may cooperate to vary the load driven voltage V_DRV on the load feedback terminal. The code generator 202 then generates a digital code CODE according to the load driven voltage V_DRV. The DAC 204, coupled to the code generator 202, may output the control voltage V_CTRL according to the digital code CODE. The feedback output unit 114 may be a resistor R4, and the feedback current I_FB flowing through the resistor R4 may be determined according to the resistance value of the resistor R4 and a voltage difference between both terminals of the resistor R4 (i.e., the difference between the feedback voltage V_FB and the control voltage V_CTRL). The feedback current I_FB may pass through the voltage dividing resistor R1 to adjust the magnitude of the output voltage V_LED, in order to achieve the stable output voltage V_LED and output current I_LED. As a result, the present invention may realize different magnitudes of the output current I_LED according to the voltage value of the reference voltage V_REF and the resistance value of the output resistor R3 with the usage of only one current source 104, where multiple current sources are not required to determine the output current I_LED by turning different current sources on or off. Therefore, the large layout area occupied by multiple current sources may be saved, and the problem where multiple current sources do not match to influence the current linearity may be prevented. This further prevents the electromagnetic interference (EMI) and light blink problems.

In general, when the constant current driver 10 is under a normal operation mode, the output current I_LED, the output voltage V_LED, the load voltage V_LOAD, the load driven voltage V_DRV, the digital code CODE, the control voltage V_CTRL and the feedback current I_FB may achieve a stable balance according to the above negative feedback control mechanism. If the LEDs needs to display different brightness, the reference voltage V_REF may be adjusted to determine the value of the output current I_LED, in order to vary the current passing through the series connected LEDs in the electrical load 100 and thereby adjust the brightness of LEDs.

In detail, the LEDs are operated in the forward bias condition and the output current I_LED is a constant value, so the cross-voltage of the LEDs should remain constant.

Therefore, when the output voltage V_LED tends to fall, the load voltage V_LOAD may fall accordingly, which further reduces the drain-to-source voltage (VDS) of the output transistor Q1. In such a situation, since the output transistor Q1 is operated in saturation mode, the gate-to-source voltage (VGS) of the output transistor Q1 may rise if its drain-to-source voltage falls (i.e., the load driven voltage V_DRV may rise), in order to allow the output current ILED passing through the output transistor Q1 to remain constant. When detecting that the load driven voltage V_DRV rises, the code generator 202 may output the digital code CODE having a smaller value, so that the DAC 204 may output a lower control voltage V_CTRL according to the smaller digital code CODE. The feedback current I_FB may then be determined according to the levels of the control voltage V_CTRL and the feedback voltage V_FB and the resistance value of the output resistor R3; that is, when the output resistor R3 has a fixed resistance value, the feedback current I_FB flowing from the power supply module 102 to the feedback device 110 is directly proportional to the voltage difference of the feedback voltage V_FB minus the control voltage V_CTRL. Therefore, the feedback current I_FB may rise when the control voltage V_CTRL falls, and the rising feedback current I_FB may pass through the voltage dividing resistor R1 to pull the output voltage V_LED up, in order to prevent the output voltage V_LED from falling. As a result, the above negative feedback mechanism may not only control the constant current driver 10 to output a stable output voltage V_LED, but also allow the current source 104 to output a stable output current I_LED to the electrical load 100.

For example, without loss of generality, assume that the magnitude of the control voltage V_CTRL is equal to the feedback voltage V_FB when the constant current driver 10 is in the normal operation mode. Since the voltage levels in both terminals of the resistor R4 are equal, there is no current flowing through the resistor R4; that is, the feedback current I_FB is equal to zero. In such a situation, the value of the output voltage V_LED is only determined by the voltage dividing resistors R1 and R2, and may be calculated as follows:

$$V\_LED = V\_FB \times \frac{R1 + R2}{R2}.$$

When the output voltage V_LED tends to fall, a lower control voltage V_CTRL may be generated according to operations of the current source 104 and the feedback device 110, which further generates the feedback current I_FB. The feedback current I_FB may pass through the voltage dividing resistor R1 to pull the output voltage V_LED up. In such a situation, the value of the output voltage V_LED may be calculated as follows:

$$V\_LED = V\_FB \times \frac{R1 + R2}{R2} + I\_FB \times R1;$$

that is, $$V\_LED = V\_FB \times \frac{R1 + R2}{R2} + (V\_FB - V\_CTRL) \times R1.$$

As can be seen, when the control voltage V_CTRL tends to fall, the value of the output voltage V_LED may tend to rise, to form a negative feedback mechanism to achieve the stable output voltage V_LED.

Similarly, when the output voltage V_LED tends to rise, the current source 104 and the feedback device 110 may cooperate to allow the feedback device 110 to output a higher control voltage V_CTRL, which further generates a lower feedback current I_FB or a reverse feedback current I_FB (i.e., the feedback current I_FB flows to the power supply module 102 from the feedback device 110), in order to prevent the output voltage V_LED from rising. The detailed operations related to the condition where the output voltage V_LED tends to rise may be obtained according to the above descriptions, and will not be narrated herein.

Please note that the present invention may provide a stable output voltage and output current for LEDs in the electrical load via a negative feedback mechanism generated by the cooperation of a current source and a feedback device, so that the LEDs may output stable light emission. With the circuit structures of the present invention, a user may adjust the reference voltage to vary the output current, in order to control the LEDs to output different brightness of light. Those skilled in the art can make modifications and alternations accordingly. For example, in the above embodiments, the feedback output unit 114 applies the resistor R4 to get across the feedback current I_FB. In another embodiment, the feedback output unit 114 may include a transistor, which may be regarded as an equivalent resistor to get across the feedback current I_FB.

On the other hand, in the embodiments illustrated in FIG. 2, the coding method performed by the code generator 202 is to output a smaller digital code CODE when receiving a higher load driven voltage V_DRV, and output a larger digital code CODE when receiving a lower load driven voltage V_DRV. The DAC 204 then converts the digital code CODE having different magnitudes into the control voltage V_CTRL with different voltage levels. In such a situation, the code generator 202 performs a reverse conversion, and the DAC 204 forwardly converts the digital code CODE into the control voltage V_CTRL. In another embodiment, the code generator 202 may perform forward conversion and the DAC 204 reversely converts the digital code CODE into the control voltage V_CTRL. For example, the code generator 202 may output a larger digital code CODE when receiving a higher load driven voltage V_DRV, and the DAC 204 then reversely converts the larger digital code CODE into a lower control voltage V_CTRL to be outputted. Alternatively, the code generator 202 may output a smaller digital code CODE when receiving a lower load driven voltage V_DRV, and the DAC 204 then reversely converts the larger digital code CODE into a higher control voltage V_CTRL to be outputted. Please note that no matter in which manners a feedback device is implemented, the structure of the feedback device belongs to the scope of the present invention as long as the feedback device outputs a control voltage and changes a feedback current so that the constant current driver may generate a stable output voltage.

Figure 3:
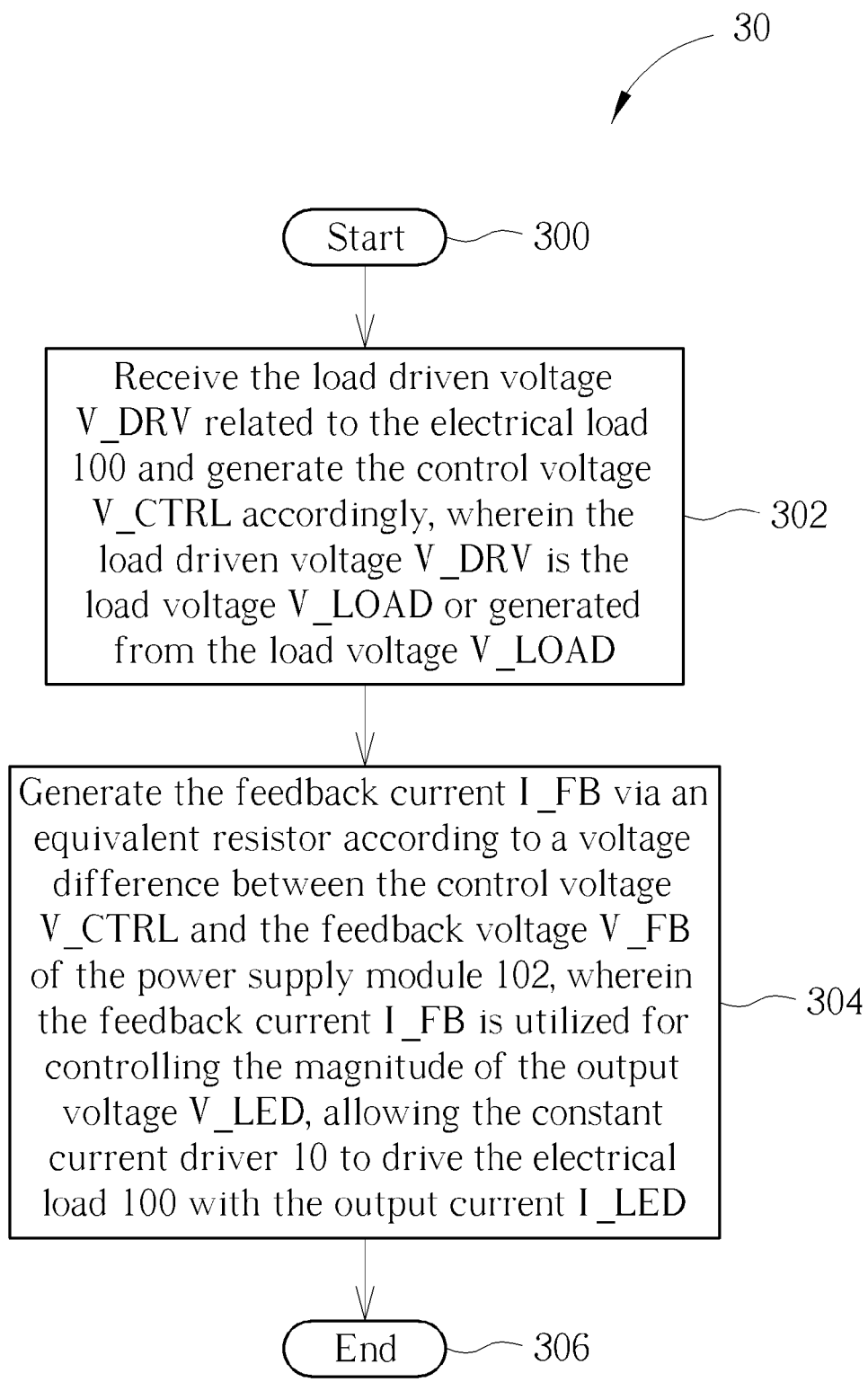
FIG. 3 is a schematic diagram of a process according to an embodiment of the present invention.

The above operations related to the feedback device 110 and the constant current driver 10 may be summarized into a process 30, as shown in FIG. 3. The process 30 includes the following steps:

Step 300: Start.

Step 302: Receive the load driven voltage V_DRV related to the electrical load 100 and generate the control voltage V_CTRL accordingly, wherein the load driven voltage V_DRV is the load voltage V_LOAD or generated from the load voltage V_LOAD.

Step 304: Generate the feedback current I_FB via an equivalent resistor according to a voltage difference between the control voltage V_CTRL and the feedback voltage V_FB of the power supply module 102, wherein the feedback current I_FB is utilized for controlling the magnitude of the output voltage V_LED, allowing the constant current driver 10 to drive the electrical load 100 with the output current I_LED.

Step 306: End.

Detailed operations and alternations of the process 30 are illustrated in the above paragraphs, and will not be narrated herein.

To sum up, the present invention provides a feedback device and method capable of providing stable output voltage and output current for the LEDs in the electrical load via a negative feedback mechanism, in order to allow the LEDs to output stable light emission. In comparison with the prior art where a large number of current sources are required for displaying different brightness, the circuit structure of the present invention allows a user to vary the output current by adjusting a reference voltage, so that the LEDs may output different brightness of light. Therefore, multiple current sources are not required for adjusting the magnitude of the output current by turning different current sources on or off. In such a condition, the large layout area occupied by multiple current sources may be saved, and the problem where multiple current sources do not match to influence the current linearity may be prevented, which further prevents the EMI and light blink problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A feedback device for a constant current driver, controlling a power supply module in the constant current driver to generate an output voltage, wherein the constant current driver drives an electrical load with an output current, the feedback device comprising:
a feedback control module, for receiving a load driven voltage related to the electrical load and generating a control voltage accordingly, wherein the load driven voltage is a load voltage or generated from the load voltage; and
a feedback output unit, coupled between the feedback control module and the power supply module, for generating a feedback current via an equivalent resistor of the feedback output unit according to a voltage difference between the control voltage and a feedback voltage of the power supply module;
wherein the power supply module controls a magnitude of the output voltage according to the feedback current, allowing the constant current driver to drive the electrical load with the output current.

2. The feedback device of claim 1, wherein the constant current driver further comprises:
a current source, coupled to a terminal of the electrical load, for generating the output current to drive the electrical load.

3. The feedback device of claim 2, wherein the current source comprises:
an output resistor;
an output transistor, comprising:
a drain terminal, coupled to the terminal of the electrical load;
a source terminal, coupled to the output resistor; and
a gate terminal, coupled to a load feedback terminal; and
an amplifier, comprising:
a first input terminal, coupled to a constant voltage source, for receiving a reference voltage;
a second input terminal, coupled to the source terminal of the output transistor and the output resistor, for controlling a voltage of the source terminal to be equal to the reference voltage, to determine the output current by using the reference voltage and the output resistor; and
an output terminal, coupled to the load feedback terminal.

4. The feedback device of claim 3, wherein the output transistor and the amplifier cooperate to vary the load driven voltage of the load feedback terminal when the load voltage of the terminal of the electrical load varies.

5. The feedback device of claim 1, wherein the feedback control module comprises:
a code generator, for receiving the load driven voltage and generating a digital code according to the load driven voltage; and
a digital-to-analog converter, coupled to the code generator, for outputting the control voltage according to the digital code.

6. The feedback device of claim 1, wherein the feedback output unit comprises a resistor, or comprises a transistor for realizing the equivalent resistor.

7. The feedback device of claim 1, wherein the feedback current flows through a voltage dividing resistor of an output terminal of the power supply module, to adjust a magnitude of the output voltage.

8. The feedback device of claim 1, wherein the electrical load comprises a plurality of light emitting diodes connected in series.

9. A feedback method for a constant current driver, for controlling
a power supply module of the constant current driver to generate an output voltage, wherein the constant current driver drives an electrical load with an output current, the feedback method comprising:
receiving a load driven voltage related to the electrical load and generating a control voltage accordingly, wherein the load driven voltage is a load voltage or generated from the load voltage; and
generating a feedback current via an equivalent resistor according to a voltage difference between the control voltage and a feedback voltage of the power supply module, wherein the feedback current is utilized for controlling a magnitude of the output voltage, allowing the constant current driver to drive the electrical load with the output current.

10. The feedback method of claim 9, wherein the step of receiving the load driven voltage related to the electrical load and generating the control voltage accordingly comprises:
generating a digital code according to the load driven voltage; and
outputting the control voltage according to the digital code.

11. The feedback method of claim 9, wherein the feedback current flows through a voltage dividing resistor of an output terminal of the power supply module, to adjust a magnitude of the output voltage.

* * * * *